April 28, 1931.                T. T. ALLEN ET AL                 1,803,088
                    SHUTTER CONTROL FOR MOTION PICTURE MACHINES
                       Filed Oct. 2, 1928       4 Sheets-Sheet 1
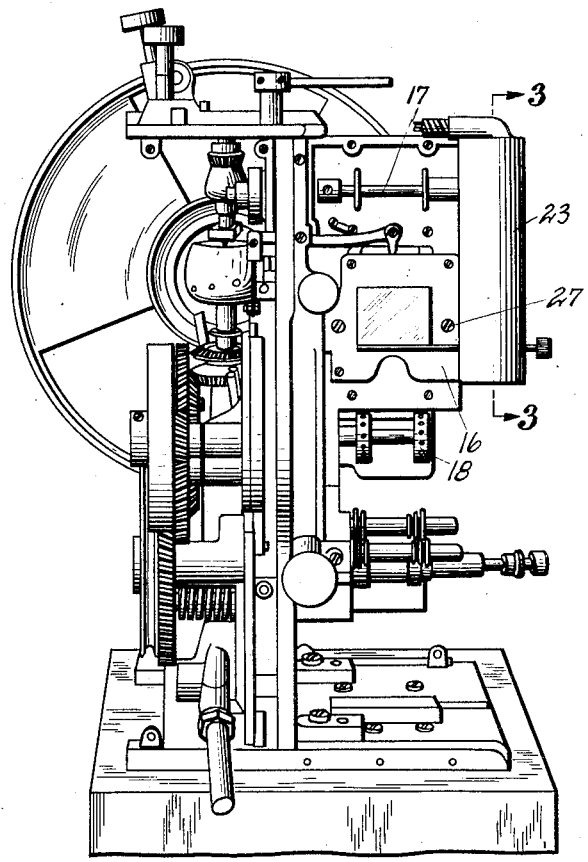
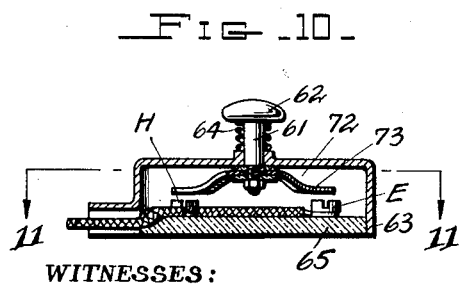
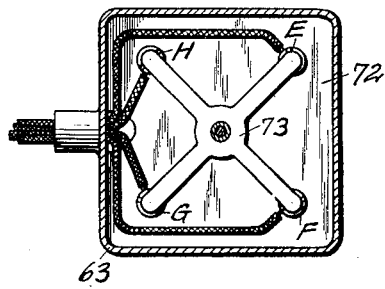
WITNESSES:
INVENTORS:
Thomas T. Allen
& Humbert Godoy,
BY
Joshua R. H. Potts
ATTORNEY

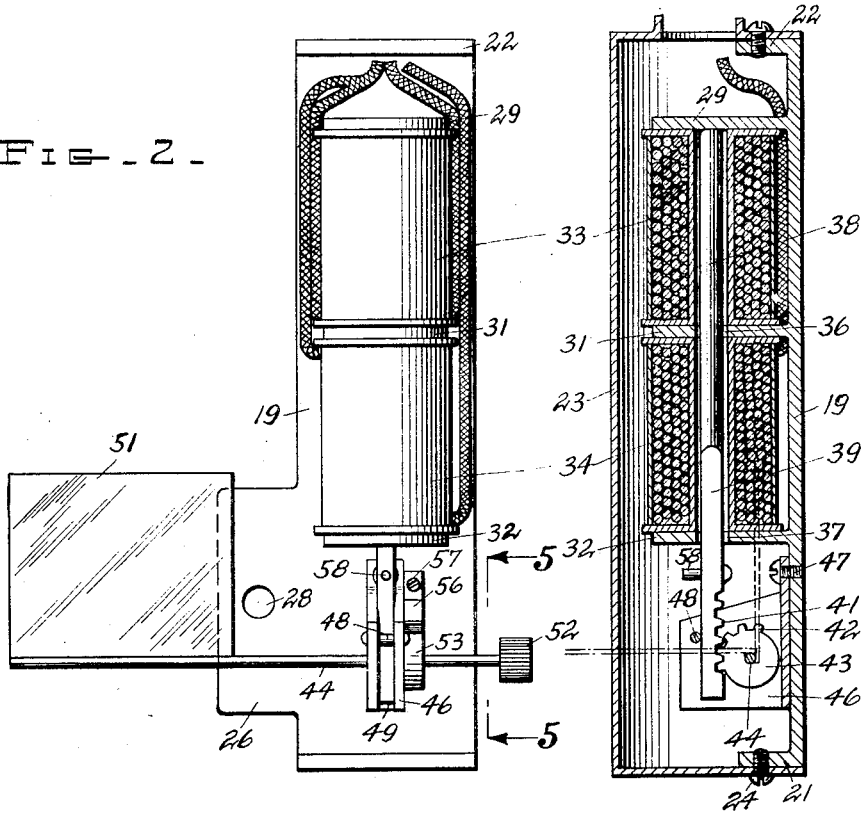

April 28, 1931.   T. T. ALLEN ET AL   1,803,088
SHUTTER CONTROL FOR MOTION PICTURE MACHINES
Filed Oct. 2, 1928    4 Sheets-Sheet 3
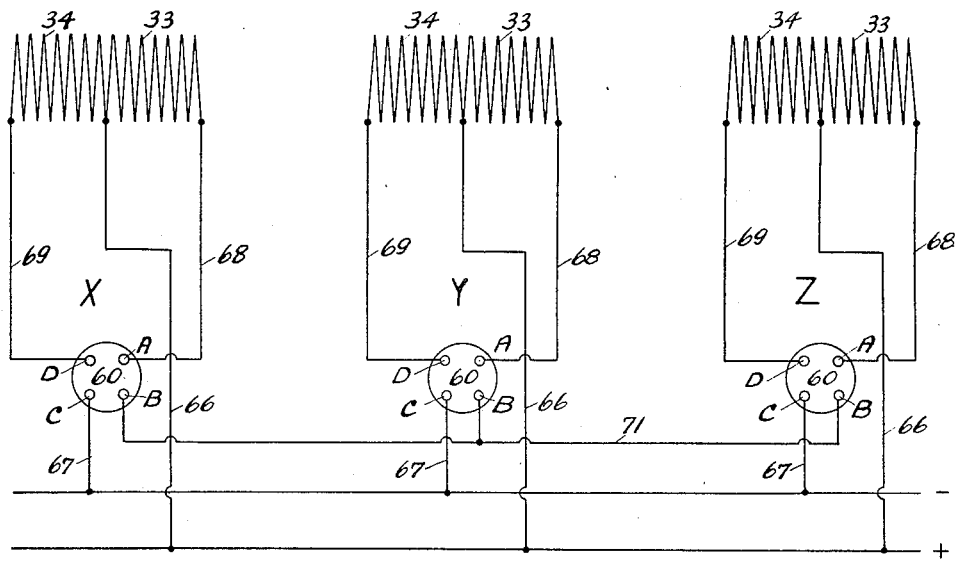
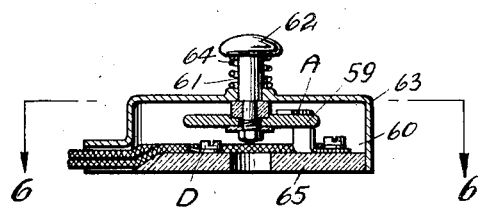
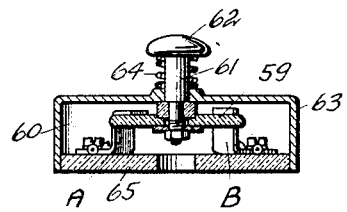
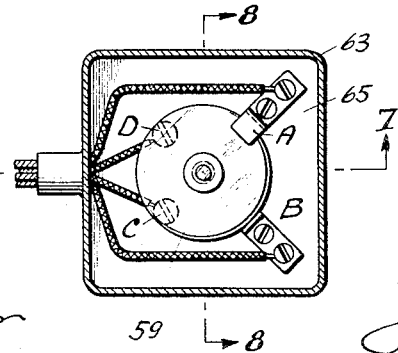
WITNESSES:
Gerhard Bade
Evelyn Crompton
INVENTOR:
Thomas T. Allen
& Humbert Godoy,
BY
Joshua R. H. Potts
ATTORNEY.

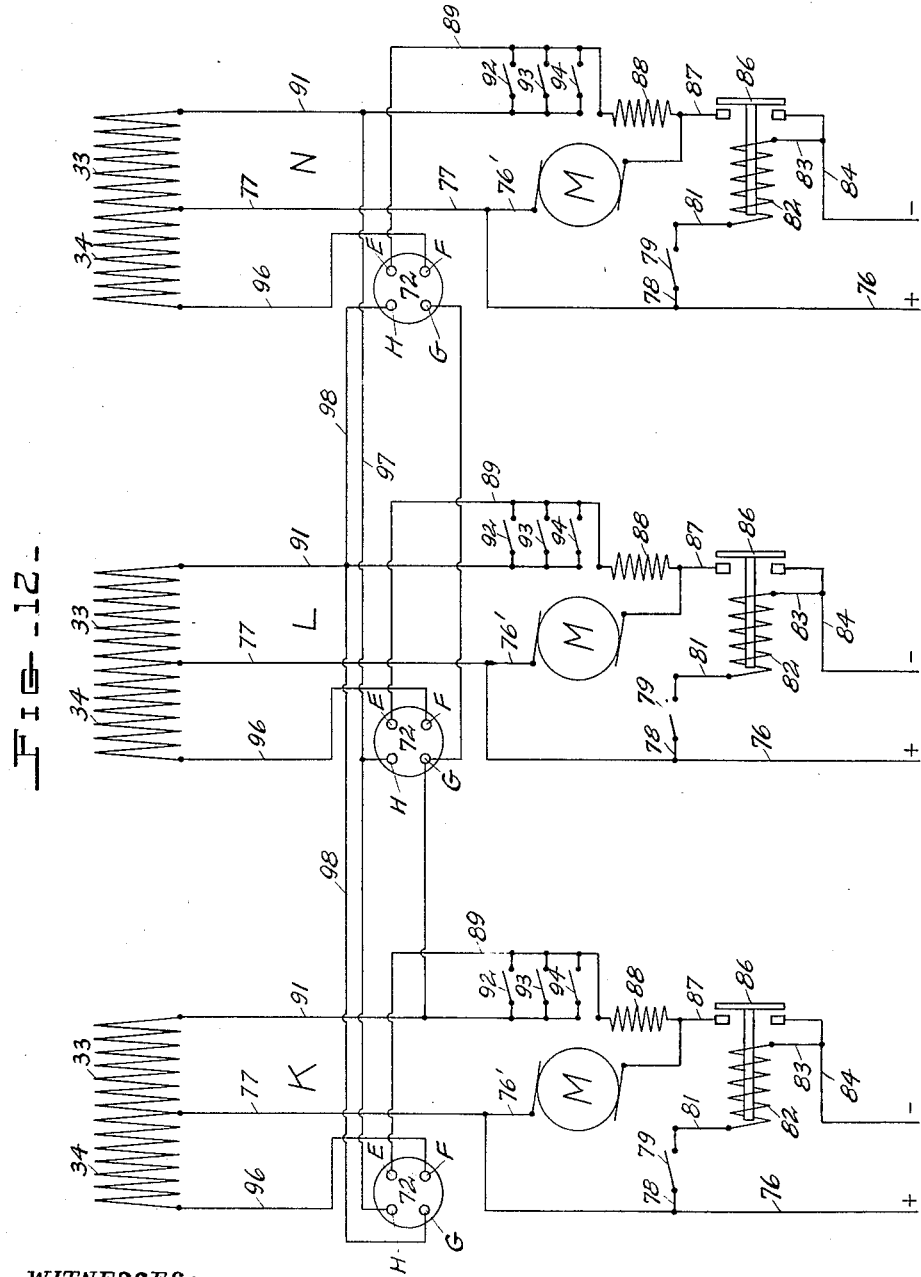

Patented Apr. 28, 1931

1,803,088

UNITED STATES PATENT OFFICE

THOMAS T. ALLEN AND HUMBERT GODOY, OF PHILADELPHIA, PENNSYLVANIA, ASSIGNORS TO SENTRY SAFETY CONTROL CORPORATION, OF PHILADELPHIA, PENNSYLVANIA, A CORPORATION OF DELAWARE

SHUTTER CONTROL FOR MOTION-PICTURE MACHINES

Application filed October 2, 1928. Serial No. 309,728.

This invention relates to appliances for motion picture projecting machines and has particular reference to a control mechanism for a shutter which is designed to close the aperture to prevent the projection of the film images; first, where it is desired to change the projection from one machine to another; and second, where the projection is faulty, caused by the breaking of the motor belt, the blowing of the motor fuse, the loss of the film loop, or the breaking of the film.

The object of the invention is to provide mechanism which will operate to close the shutter of one projecting machine and to open the shutter of another machine by a simple electrical control.

In case two or more machines are used, after being properly focused, the first film reel may be mounted in one of the machines and the second film reel in another machine, and so on. The mechanism is designed so that by simply pressing a button, the projection of the first machine will be discontinued and the film of the second or succeeding machine projected simultaneously with the stopping of the first machine so that there will be no appreciable break in the projection.

Another object is to provide, in addition to the foregoing object, shutter mechanism which may be automatically operated to close the shutter in the event of faulty projection of the film images.

According to the invention, the shutter control comprises solenoids having a movable armature which is connected to mechanism for opening and closing the shutter over the aperture in the film heat shield. The shutter may also be operated by any one of the various safety switches which are placed at various points in the mechanism and are designed to operate upon the breaking of the motor belt or the breaking of a film, and which may be found in many forms in the patented art.

The drawings illustrate an embodiment of the invention and the views therein are as follows:

Figure 1 is a perspective view of the mechanism assembly of a Simplex motion picture projection machine and shows the invention as applied thereto, Figure 2 is an enlarged front view of the shutter mechanism with the cover removed, Figure 3 is an enlarged view of the same with the cover in position and is taken on the line 3—3 of Figure 1, Figure 4 is an enlarged plan view thereof and shows the manner of fastening the same into the film heat shield, which is shown in said figure in dot-and-dash lines, Figure 5 is a vertical section on the line 5—5 of Figure 2, Figure 6 is a horizontal sectional view of a switch such as used when the shutter control mechanism is intended for use only as a change over from one projecting machine to another and is taken at a point indicated by the line 6—6 in Figure 7, Figure 7 is a vertical sectional view of the same taken through the complete switch at a point indicated by line 7—7 in Figure 6, Figure 8 is a like view taken at a point indicated by the line 8—8 of Figure 6 and looking in the direction of the arrows, Figure 9 is a wiring diagram showing the shutter control mechanism incorporated in the electrical wiring of a group of projection machines and intended only as a change over from one machine to another, Figure 10 is a vertical section of the switch used for actuating the control mechanism when it is used both for a change over and as a safety appliance, Figure 11 is a horizontal sectional view thereof, taken on the line 11—11 of Figure 10 and looking in the direction of the arrows, and Figure 12 is a wiring diagram showing the shutter control mechanism incorporated in the electrical wiring of a group of projection machines and adapted to operate, not only as a change over from one machine to another, but also to be operated electrically, in the event of faulty projection of the film.

Motion picture machines are equipped with a film heat shield 16 in which an automatic fire shutter (not shown) operates to fall between the film and the rays of light from the arc when the film feeding mechanism stops. This is part of the standard equipment and for the sake of convenience, a Simplex motion picture machine is shown in Figure 1 as illustrative. The film is fed over the lateral guide roller 17 and behind the film heat shield and over the sprockets 18.

Considering Figures 1 to 4, the shutter mechanism comprises a rear flat plate 19 which is preferably a brass casting and which has the inwardly extending flanges 21 and 22 for attaching a cover 23 by means of the screws 24. This plate has a lateral projection 26 which fits between the plates of the film heat shield 16, as shown in dot-and-dash lines in Figure 4, and the heat shield fastening screw 27 is extended through the hole 28 on said projection and supports the apparatus in position; the cover 23 being in contact with and maintained along the side of said heat shield.

The flat plate 19 is provided with an upper forward extension 29, an intermediate forward extension 31, and a lower forward extension 32. Between the upper and intermediate forward extensions is a solenoid 33, while between the intermediate and lower forward extensions is a solenoid 34.

The intermediate and lower forward extensions are provided with central openings 36 and 37, respectively, and an armature core 38 is adapted to be movably mounted in said solenoids through said openings. The armature core 38 is composed of soft iron and has a brass extension 39, and the lower end of said extension is provided with a toothed rack 41 which meshes with the tooth 42 on a partially geared wheel 43. This wheel is mounted on an elongated shaft 44 which extends through a slotted casting 46 which is fastened to the flat plate 19 beneath the forward projection 32 by a screw 47.

The lower toothed end of the extension 39 extends downward through the slot 49 in the casting 46. Said casting is provided with a pin 48 which extends through the slot 49 thereof and maintains the toothed rack 41 on the brass extension 39 in contact with the teeth on the wheel 43.

The long end of the elongated shaft 44 is provided with a shutter plate 51 while its other end is provided with a knurled or serrated thumb wheel 52 for operating the shutter by hand. A collar 53 is fastened to the shaft 44 at one side of the slotted casting 46 and this collar is provided with a retaining lug or button 54 which is engaged by a leaf spring 56, fastened to the casting 46 by the screw 57 to hold the shutter plate in raised position when it has been so drawn by the action of the solenoid 33 on the armature core 38.

The brass extension 39 is provided with a pin 58 for limiting the downward movement of the armature core 38.

The thumb wheel 52 is operated to lower the shutter plate 51 when the film is being framed in the projecting machine and is then again operated to raise it, if desired, although this is not necessary in case the mechanism is wired, as shown by Figure 12, as the closed centrifugal switch therein shown will close the circuit to energize the solenoid 33 and raise the shutter when the switch for starting the motor is closed.

The shutter control mechanism when installed for use only as a change over from one machine to another, is operated by the switch 60, shown in Figures 6, 7 and 8. This switch has a central contacting member 59 carried by a pin 61 with an operating button 62 at its outer end for actuating the same; the contacting member being normally held at the upper part of the casing 63 by the action of the spring 64.

This switch is provided with contacts A, B, C and D mounted on the insulating base 65. The contact A extends upward and contacts with the contacting member 59 only when the latter is in its raised position. The contact B is adapted to make contact with the contactor at all times, either when said member is raised or lowered, and the contacts C and D contact with the contactor only when the same is lowered.

In explaining the use of the switch 60, let us consider Figure 9 as representing the wiring for the shutter mechanisms incorporated in three projecting machines X, Y and Z.

The wires indicated by the symbols, plus (+) and minus (−) are the current supply lines and a wire 66 extends from the plus line to a point common with the windings of the upper and lower solenoids 33 and 34 in each machine. The wire 67 connects the minus side of the supply line with the contact C of the switch. The contact A of the switch is in each instance connected to the top of the solenoid 33 by a wire 68, while the contact D is connected to the bottom of solenoid 34 by a wire 69. A common wire 71 connects each of the contacts B.

Let us suppose that the shutter plate 51 in each of the machines X, Y and Z is raised or closed, as shown in Figure 2, so as to close the aperture in the heat shield, and it is desired to lower or open the shutter in the machine Z. It must be remembered that the contacts A and B are always connected when the contacting member 59 is in its raised position, as shown in Figure 8.

When the button 62 of the switch on the machine Z is pressed downward, the contacting member 59 connects the contacts B, C and D and disengages the contact A. Consequently, current will flow from the plus line, through the wire 66, down through the solenoid 34, through the wire 69 to the contact D and across the contact D to the contact C, and thence outward, through the wire 67 to the minus line. The energization of the solenoid 34 will draw the armature core 38 downward and the geared wheel 43 will be rotated by means of the toothed rack 41 on the brass extension 39, and the shaft 44 will be rotated, thereby releasing the collar 53 from the spring 56 and the shutter will be thrown downward, thereby opening the aperture.

During the operation of the machine Z, the shutters on the machines X and Y will remain closed. Let us suppose that the first reel of a picture was being projected by the machine Z, and the second reel is ready for projection in the machine Y.

At the moment when the reel in the machine Z is about exhausted, the button of the switch 60 on the machine Y is pressed, thereby engaging the contacts B, C and D thereof with the contacting member 59. The solenoid 34 of the machine Y will be thus energized and the shutter 51 on said machine opened, in the manner just described in connection with the machine Z.

However, the contacting member 59 in the switch 60 on the machine Z having been raised to its normal position after operation, by means of the spring 64, the contacts A and B will be connected. As the wire 66 in each machine permanently connects with the plus wire and with the common wire between the solenoids 33 and 34, current will flow down through the wire 66 of the machine Y, thence through the solenoid 34 and through the wire 69 to the contact D, across the contacting member 59, to the contact C, thence through the wire 67 to the minus line.

Current will also flow down through the wire 66 of the machine Z, through the solenoid 33, and the wire 68, to the contact A on the switch of the machine Z, thence across the contacting member 59 to the contact B, thence through the wire 71 which is connected to the contact B of the switch 60 on the machine Y, and as the contacting member 59 of this switch contacts with the contacts B and C when the said member 59 is pressed downward, the circuit will be completed, as the contact C is connected to the minus wire by the wire 67. Since the contacts A and B are always connected when the switch is in a raised position, the connection of the contacts C and B on any other machine will complete the circuit through the solenoid 33, which energizes said solenoid.

As the solenoid 33 of the machine Z is energized, the armature core 38 is drawn upward to the position shown in Figure 3 and the toothed rack 41 on the brass extension 39 will rotate the geared wheel 43, thereby rotating the shaft 44 and closing the shutter plate 51 by raising it to the position shown in Figure 2.

At the same time, the collar 53 will be rotated and the flat spring 56 will engage the lug or button 54 and retain the shutter plate in its raised position when the pressure is taken off the button 62, which raises the button 62 of the switch, and which permits the contacting member 59 to be raised by the spring 64 and the solenoid 33 deenergized.

In other words, the energization of the solenoids 33 and 34 in each instance, is momentary and obtains only so long as pressure is placed upon the button 62 of any of the switches to force the contacting member 59 into contact with the contacts B, C and D.

The switch 72, shown in Figures 10 and 11, has a contacting member 73 with integral contacting arms adapted to engage each of the contacts E, F, G and H when the button 62 is pressed downward by compressing the spring 64. This button is used when the shutter control mechanism is incorporated in a motion picture machine for use, both as a change over, and as a safety device for operating to close the shutter in the event of faulty projection of the film.

Considering the wiring diagram of Figure 12, let K, L and N represent the wiring of the shutter mechanism of three distinct motion picture projecting machines. M, in each instance, represents the motor of that particular machine. Each machine is connected to the plus supply line by the wire 76, which connects with a wire 77 which extends from the common terminal between the solenoids 33 and 34 and to one side of the motor. A wire 78 connects one terminal of a switch 79, while the other terminal connects with a wire 81 which extends to one end of a relay coil 82. The other end of the relay coil is connected by the wire 83 to a wire 84. The wire 84 connects the minus or negative side of the supply line and extends to one terminal of the magnetic switch 86; the other terminal of which is connected by a wire 87 to the other terminal of the motor. The wire 87 also extends to a resistance 88 and the other side of this resistance is connected by a wire 89 to the contact E on the switch 72.

The wire 91 connects the upper end of the solenoid 33 and between this wire and the wire 89, a centrifugal switch 92 is connected and also switches 93 and 94. The centrifugal switch 92 is of the type illustrated and described in the joint application by Thomas T. Allen, one of the applicants herein, and John Francis Adams, filed December 13, 1927, Serial No. 239,622.

The switches 93 and 94 may be of the type shown and described in the co-pending application of Joseph E. Cohen, Serial No.

204,455, filed July 9, 1927, or any approved switch for actuation by any of the moving parts of a motion picture machine in the event of faulty projection.

The lower side of the solenoid 34 is connected by a wire 96 which extends and is connected to contact F. Each of the machines K, L and N are wired in the precise manner just explained.

The wire 91 of the machine N connects with the contact H on the switch of each of the machines L, and K through the wire 97. The contact H on the switch of the machine N is connected by wire 98 which connects the wire 91 of the machine L and the contact G of the switch 72 on the machine K.

Let us consider that the first, second and third reels of a film are placed in the machines N, L and K, respectively. It is first desired that the motion picture machine N be set in motion and this is accomplished by closing the switch 79, whereupon current will flow through the wire 76, the wire 78, across the switch 79, the wire 81, through the relay coil 82, the wire 83, and the wire 84, back to the negative supply line.

The action of the current passing through the relay coil 82 will close the magnetic switch 86 so that current will flow from the wire 76, around through the wire 76' to the motor, thence through the wire 87, the magnetic switch 86, and the wire 84, back to the negative side of the supply line.

When the motor is idle the switch 92 will be closed, and will close a circuit which extends around from the positive side of the supply line through the wire 76, the wire 77, the solenoid 33, the wire 91, the switch 92, the resistance 88, the wire 87, the magnetic switch 86 and the wire 84 to the negative side of the supply line.

As the shutter plate 51 was, however, raised, this will have no effect whatever upon the solenoid, since the armature core 38 was held in a raised position therein by the spring 56 pressing against the button 54 on the collar 53 and when the motor is operated the switch will be normally opened. In order to lower the shutter, the switch 72 is operated by pressing the button 62, whereupon current will flow from the positive supply line, through the wire 76 and the wire 77, through the solenoid 34 and the wire 96 to the contact F, thence across the contacting member 73, which connects the contact E, thence through the wire 89, the resistance 88, the wire 87, the magnetic switch 86, and the wire 84, to the negative side of the supply line; the solenoid 34 being thus energized, the armature core 38 will be drawn downward therein and the shaft 44 will be rotated, as before described, so as to open the aperture by dropping the shutter plate 51.

Let us now assume that the reel in the machine N is about exhausted and it is desired to project the reel from the machine L. The switch 72 of that machine is now operated and the solenoid 34 of the shutter mechanism on that machine will be energized and the shutter plate 51 lowered, as just explained.

As the shutter opens on the machine L, the shutter will close on the machine N. Since the contacting of the contact member 73 with the contacts E, F, G and H is momentary, there is no connection between these contacts on the switch of the machine N during the projection of the film with the shutter down. When the switch on the machine L is closed, the contacts thereon will be connected by the contacting member 73 and current will flow through the wire 96 on the machine L, to the contact F, across the contacting member 73, to the contact E, thence out through the wire 89, the resistance 88, the wire 87, the switch 86 and the wire 84, to the minus side of the supply line. At the same time, current will flow from the plus supply line through the wire 76 in the machine N, through the wire 77, the solenoid 33 and the wire 91, where it will pass down through the wire 97 to the contact H on the switch 72 of the machine L and the contacting member 73 will connect the contact H and the contact E so that the circuit will be completed through the wire 89, as just described.

When the solenoid 33 in the machine N is energized by the pressing of the switch 72 on the machine L, the shutter plate 51 on the machine N will be raised by reason of the armature core 38 being pulled upward in the said solenoid 33 and the shaft 44 rotated through the medium of the toothed rack 41 and the geared wheel 43.

When the second reel in the machine L is about exhausted, the switch 72 on the machine K is operated. The solenoid 34 in this machine will now be energized precisely as stated in connection with the machines N and L and the contacting member 73 being in engagement with all of the contacts E, F, G and H, the current will flow through the wire 76 of the machine L, through the wire 77, and the solenoid 33, thence down through the wire 98 to the contact G of the switch on the machine K, and will join the current flowing from the contact F to the contact E and will flow out to the minus supply line through the wire 89, the resistance 88, the wire 87, the magnetic switch 86, and the wire 84.

Let us now consider the operation of the shutter plate 51 as a safety device. This can be considered in connection with the machine N which we will suppose to be operating. In order that the machine could be started to operate, it was necessary to press the button on the switch 72 in order to energize the solenoid 34 to lower the shutter and immediately upon the release of the button 62 of the switch 72, the contacting member 73 was thrown out of contact with each of the contacts E, F, G and H, by the spring 64. The shutter, however, remained open and continued to so remain until the solenoid 33 was energized to draw the armature core 38 upward to rotate the shaft 44.

Let us now consider that the speed of the machine decreased beyond a predetermined rate. In such an event, the centrifugal switch 92 would close, thereby completing the circuit between the wires 89 and 91. This would cause current to flow from the positive side of the supply line, through the wire 76, the wire 77, the solenoid 33, the wire 91, through the centrifugal switch 92, the wire 89, the resistance 88, the wire 87, the magnetic switch 86, and the wire 84 to the minus side of the supply line; the solenoid 33 being thus energized, the armature core 38 would be drawn upward into the same, the geared wheel 43 turned and the shaft 44 rotated to raise the shutter plate 51 across the aperture in the film heat shield, and through which, the film had previously been projected.

It will be readily seen that the closing of either of the switches 93 or 94 will have precisely the same effect upon closing the shutter plate 51 as would the closing of the centrifugal switch 92. These switches, as previously mentioned, are located at suitable points throughout the mechanism of the motion picture machine and operate in case the film loop is lost or in the event that the film breaks, or the motor belt breaks.

It is, therefore, evident that the shutter control mechanism may be employed for rapid change over from one projecting machine to another by the actuation of a single switch, and that the mechanism can also be employed as a safety device for closing the shutter plate between the film and the rays of light from the arc in the event of faulty projection of the images of the film.

Of course, the shutter control mechanism illustrated may be modified and changed in various ways without departing from the invention herein disclosed and hereafter claimed.

The invention is hereby claimed as follows:

1. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, and means for alternately energizing one of said solenoids and deenergizing the other solenoid to raise and lower said shutter.

2. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, and means for lowering said dowser in the event of faulty operation of the machine.

3. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, and safety switches for deenergizing the solenoid which sustains the shutter in lowered position when the travel of the film is faulty.

4. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, and means for retaining the toothed extension and toothed wheel in engaged relation.

5. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, and means for limiting the vertical movement of the toothed rack.

6. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, bifurcated means forming a guideway for said toothed extension, and means for holding said extension and toothed wheel in engagement.

7. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, and means for holding said shutter in raised position when the solenoid which has so positioned it is deenergized.

8. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, a collar on said shaft, a button on the periphery of said collar, and a spring engaging said button to hold said shutter in raised position when said solenoids are deenergized.

9. Shutter mechanism for use with motion picture machines, comprising a pair of solenoids, an armature core movable in said solenoids and having a toothed extension below the same, a shaft having a shutter mounted along the length thereof, a toothed wheel on said shaft meshing with said toothed extension, means for alternately energizing one of said solenoids and deenergizing the other solenoid to raise and lower said shutter, means for retaining the toothed extension and toothed wheel in engaged relation, and means for limiting the vertical movement of the toothed rack.

In testimony whereof we have signed our names to this specification.

THOMAS T. ALLEN.
HUMBERT GODOY.